(12) United States Patent
Carlos (10) Patent No.: US 10,683,024 B2
(45) Date of Patent: Jun. 16, 2020

(54) PIVOTING-SAFETY WHEELBARROW HANDLE

(71) Applicant: Emmanuel Carlos, El Cajon, CA (US)

(72) Inventor: Emmanuel Carlos, El Cajon, CA (US)

( * ) Notice: Subject to any disclaimer, the term of this patent is extended or adjusted under 35 U.S.C. 154(b) by 0 days.

(21) Appl. No.: 16/450,371

(22) Filed: Jun. 24, 2019

(65) Prior Publication Data

US 2019/0308653 A1 Oct. 10, 2019

Related U.S. Application Data

(63) Continuation-in-part of application No. PCT/IB2017/058385, filed on Dec. 22, 2017.

(60) Provisional application No. 62/438,146, filed on Dec. 22, 2016.

(51) Int. Cl.
*B62B 1/18* (2006.01)
*B62B 5/06* (2006.01)
*B62B 1/20* (2006.01)

(52) U.S. Cl.
CPC ............ *B62B 5/062* (2013.01); *B62B 1/18* (2013.01); *B62B 1/20* (2013.01)

(58) Field of Classification Search
CPC ............ B62B 5/062; B62B 5/06; B62B 1/18
See application file for complete search history.

(56) References Cited

U.S. PATENT DOCUMENTS

| | | | | |
|---|---|---|---|---|
| 5,054,830 A | * | 10/1991 | Nisenbaum | B25G 1/00 16/426 |
| 5,153,966 A | * | 10/1992 | Godwin | B62B 5/06 16/421 |
| 5,794,307 A | * | 8/1998 | Overcash | B62B 1/18 16/427 |
| 6,550,104 B2 | * | 4/2003 | Cacciacarne | B62B 5/06 16/426 |
| 7,121,565 B2 | * | 10/2006 | Lulay | B62B 5/06 280/47.315 |
| 9,194,407 B1 | * | 11/2015 | Straney | F16B 2/06 |
| 9,333,639 B2 | * | 5/2016 | Thresher | E01H 5/02 |
| 2011/0221147 A1 | * | 9/2011 | Hatcher | B62B 5/06 280/47.31 |

* cited by examiner

*Primary Examiner* — John D Walters
*Assistant Examiner* — James J Triggs (57) ABSTRACT

The pivoting-safety wheelbarrow handle is an apparatus that correctly positions and orients the grip of the user while operating a wheelbarrow. The apparatus may be integrated into the handlebar of a wheelbarrow or serve as a universal attachment with a variety of wheelbarrows. The apparatus includes an arched brace, an annular frame, a main handlebar, a first stopper, and a second stopper. The annual brace mounts and positions the annular frame. The annular frame fixes the main handlebar and orients the grip of the user. The main handlebar allows the user to grasp onto the apparatus and maneuver the wheelbarrow. The first stopper and the second stopper limit the rotation of the annular frame. The apparatus preferably includes a wheelbarrow handlebar that is integrates the apparatus to a wheelbarrow. Alternatively, the apparatus includes a handlebar-receiving sleeve that mounts the apparatus onto a handlebar of a variety of wheelbarrows.

12 Claims, 8 Drawing Sheets

PIVOTING-SAFETY WHEELBARROW HANDLE

The current application claims a priority to the International (PCT) Application serial number PCT/IB2017/058385 filed on Dec. 22, 2017 and a priority to the U.S. Provisional Patent application Ser. No. 62/438,146 filed on Dec. 22, 2016.

FIELD OF THE INVENTION

The present invention generally relates to wheelbarrow accessories. More specifically, the present invention is a pivoting-safety wheelbarrow handle.

BACKGROUND OF THE INVENTION

Operating a wheelbarrow can easily result in an injury. Depending on the load in the tray of the wheelbarrow, maneuvering a wheelbarrow may cause severe back damage. More common injuries while operating a wheelbarrow include hand and wrist injuries. Hand and wrist injuries result from improper grips and rigid handlebars. A proper grip allows the heavier loads to be easily maneuvered.

It is therefore an object of the present invention to position and orient the grasp of a user about the handlebar of the wheelbarrow. The present invention provides an ergonomic grip for the user. The present invention accommodates the free rotation of the grasp of the user while maintaining the safety of the user. The present invention allows the user to orient his or her grasp in order to minimize the amount of force to maneuver the wheelbarrow. The present invention may be incorporated into a wheelbarrow. The present invention may also serve as a universal attachment for a variety of wheelbarrows.

DETAIL DESCRIPTIONS OF THE INVENTION

All illustrations of the drawings are for the purpose of describing selected versions of the present invention and are not intended to limit the scope of the present invention.

Figure 1:
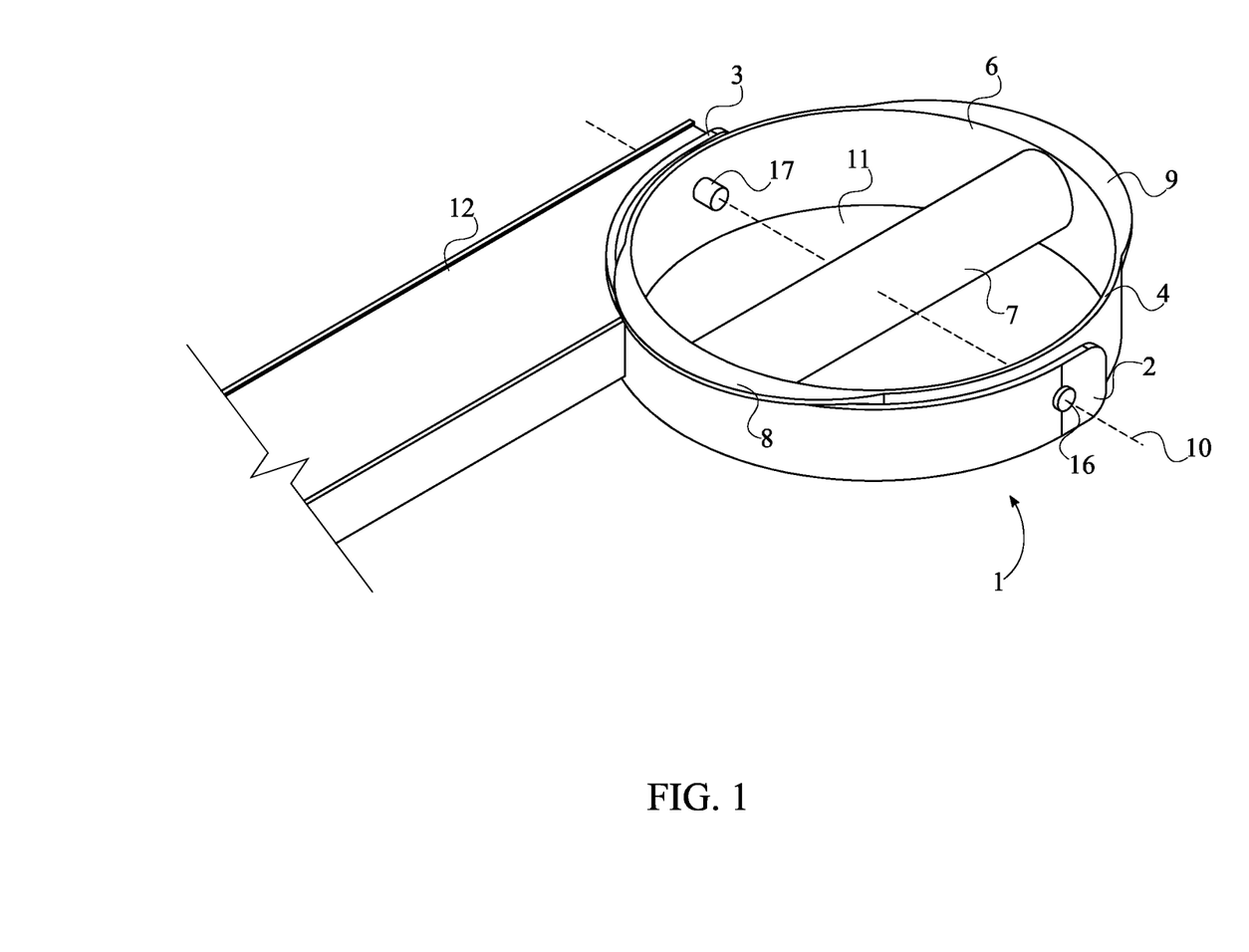
FIG. 1 is a top perspective view of the preferred embodiment of the present invention with a shield.
Figure 5:
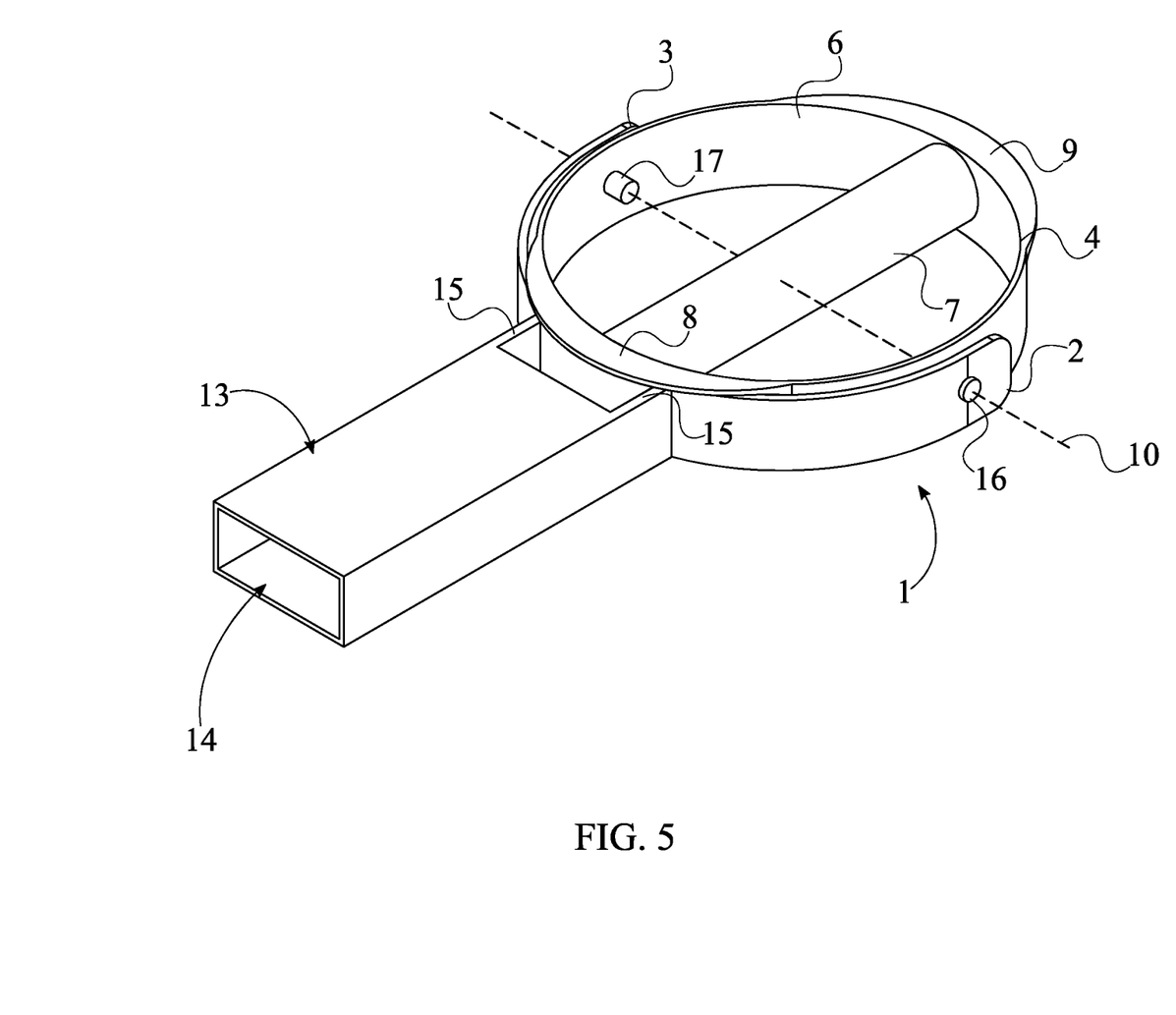
FIG. 5 is a top perspective view of an alternate embodiment of the present invention.

The present invention is a pivoting-safety wheelbarrow handle that correctly positions the grip of a user about the handlebar of a wheelbarrow. The present invention prevents the user from straining his or her hand while operating a wheelbarrow. The present invention accommodates various movements and positions of the grip of the user while maneuvering a wheelbarrow. In order to accommodate various movements and positions of the wheelbarrow, the present invention comprises an arched brace 1, an annular frame 6, a main handlebar 7, a first stopper 8, and a second stopper 9, seen in FIG. 1 and FIG. 5. The arched brace 1 upholds and positions the annular frame 6. In order to effectively uphold and position the annular frame 6 and accommodate the rotation of the annular frame 6, the arched brace 1 comprises a first end 2 and a second end 3. The annular frame 6 accommodates the rotation of the grip of the user and positions the grip of the user via the main handlebar 7. The main handlebar 7 allows a user to safely grasp the present invention and operate the wheelbarrow. Both the first stopper 8 and the second stopper 9 prevent the hand of the user from getting injured in between the arched brace 1 and the annular frame 6 throughout the rotation of the annular frame 6.

Figure 2:
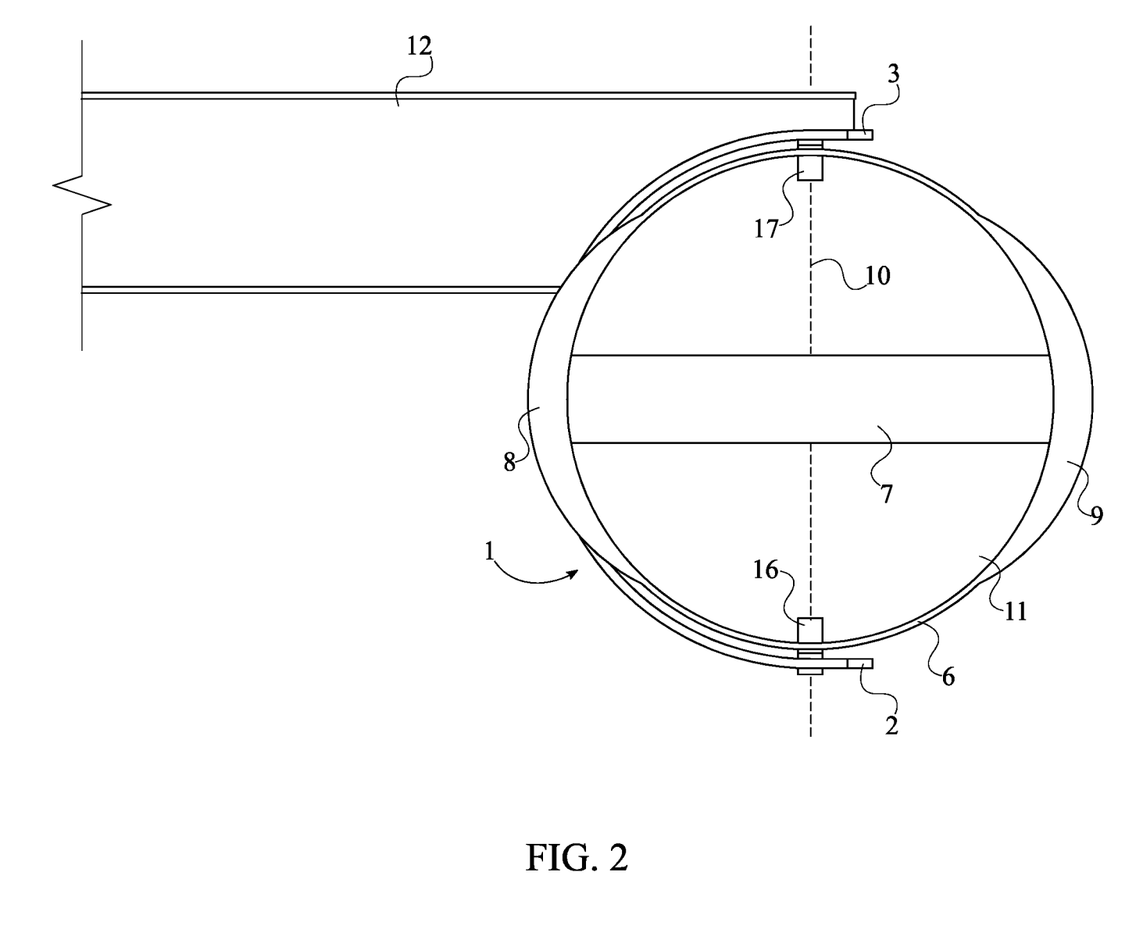
FIG. 2 is a top side view of the preferred embodiment of the present invention with a shield.
Figure 3:
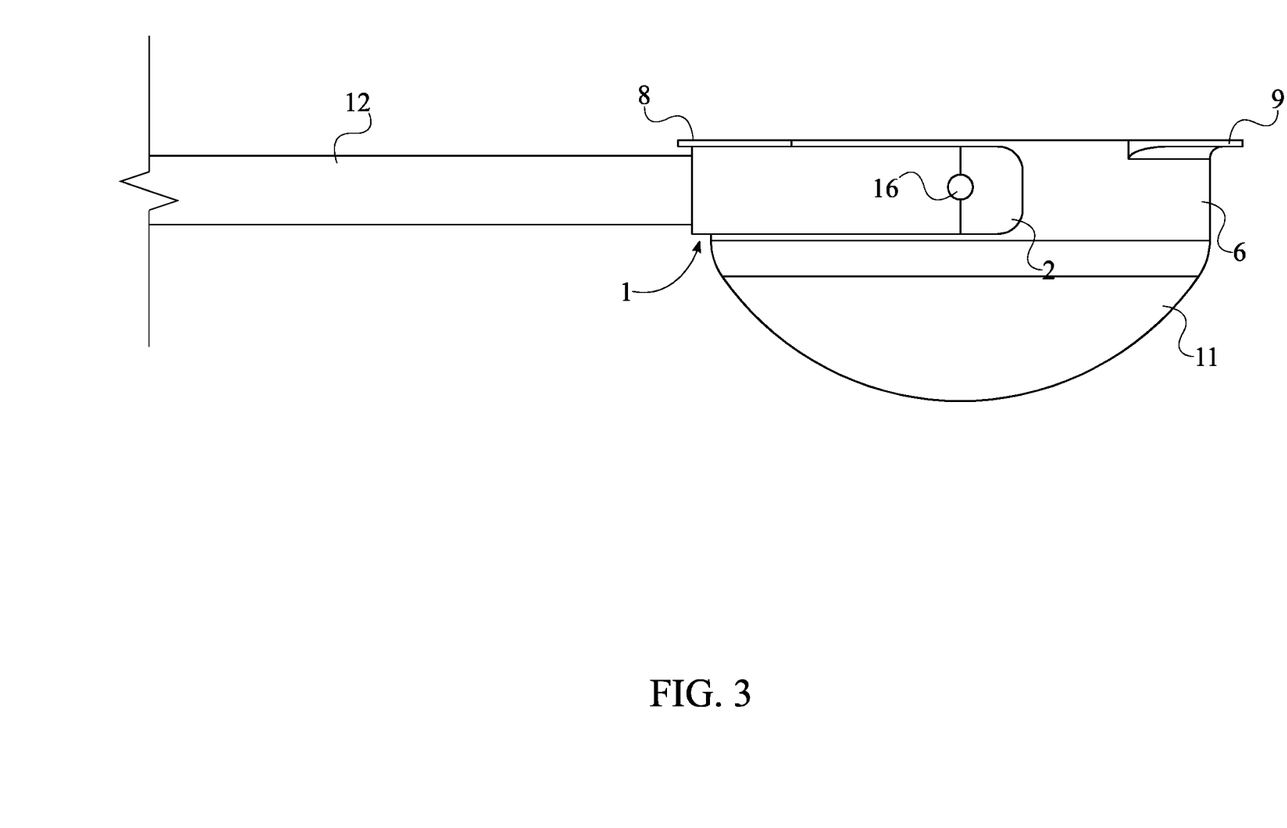
FIG. 3 is a right side view of the preferred embodiment of the present invention with a shield.
Figure 4:
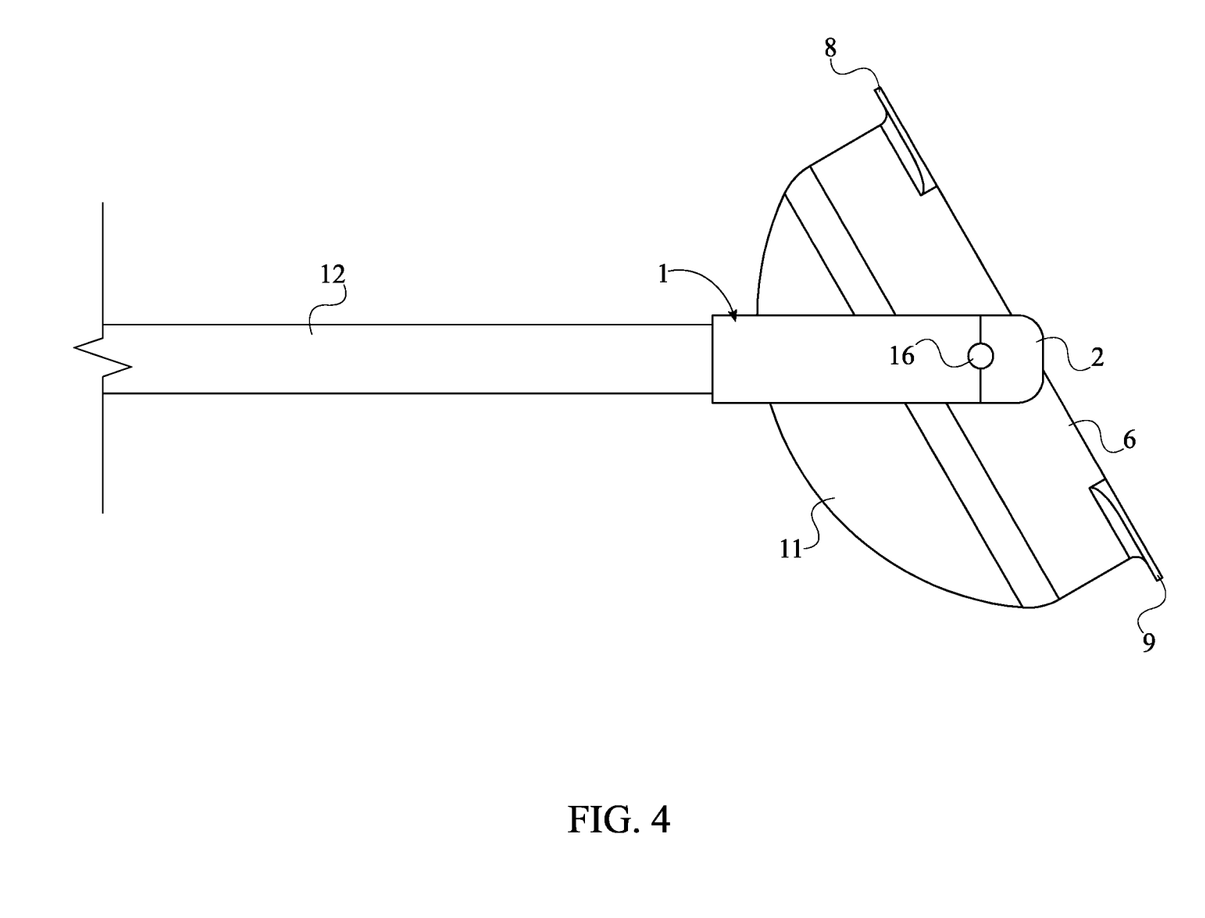
FIG. 4 is a right side view of the preferred embodiment of the present invention with a shield partially rotated.
Figure 6:
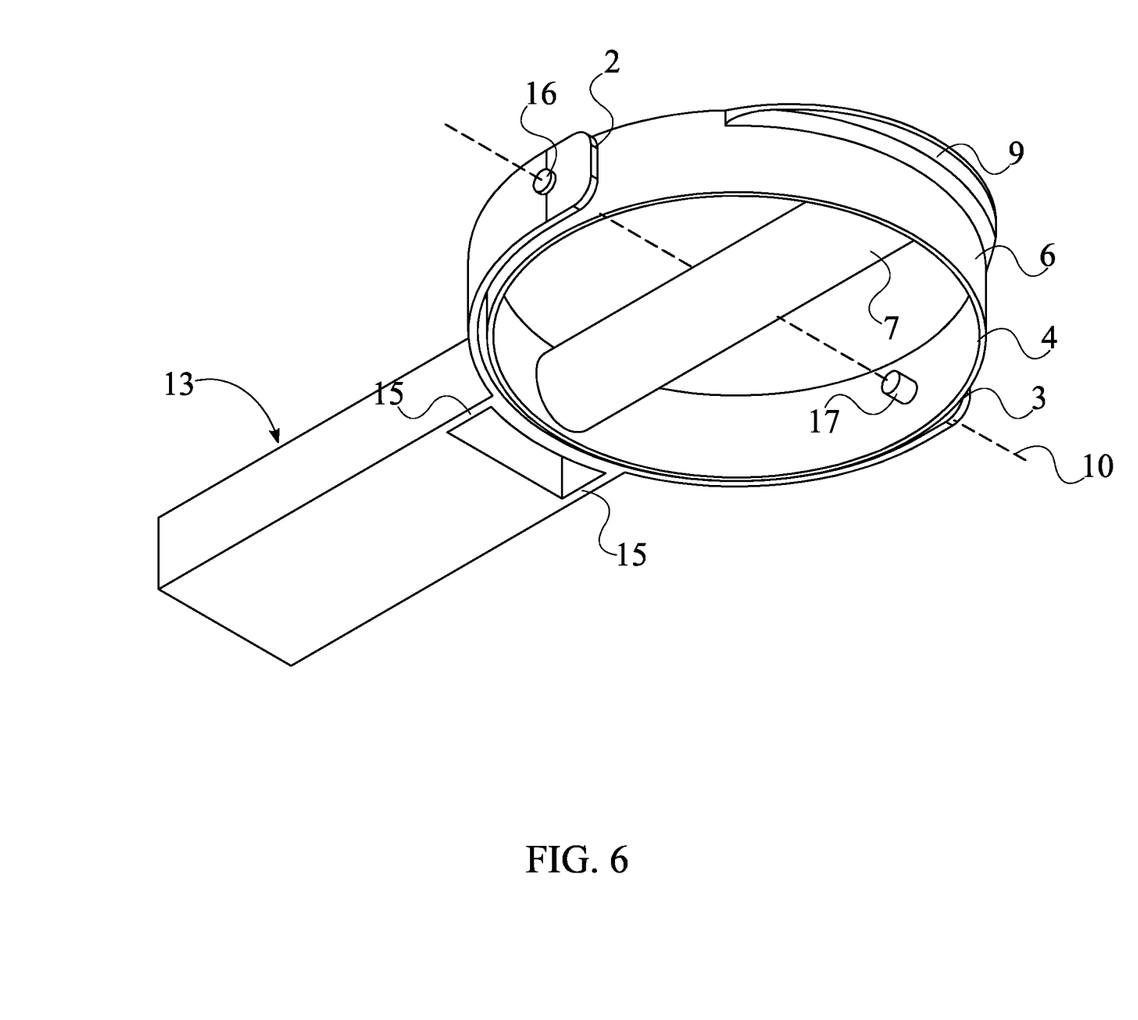
FIG. 6 is a bottom perspective view of an alternate embodiment of the present invention.
Figure 7:
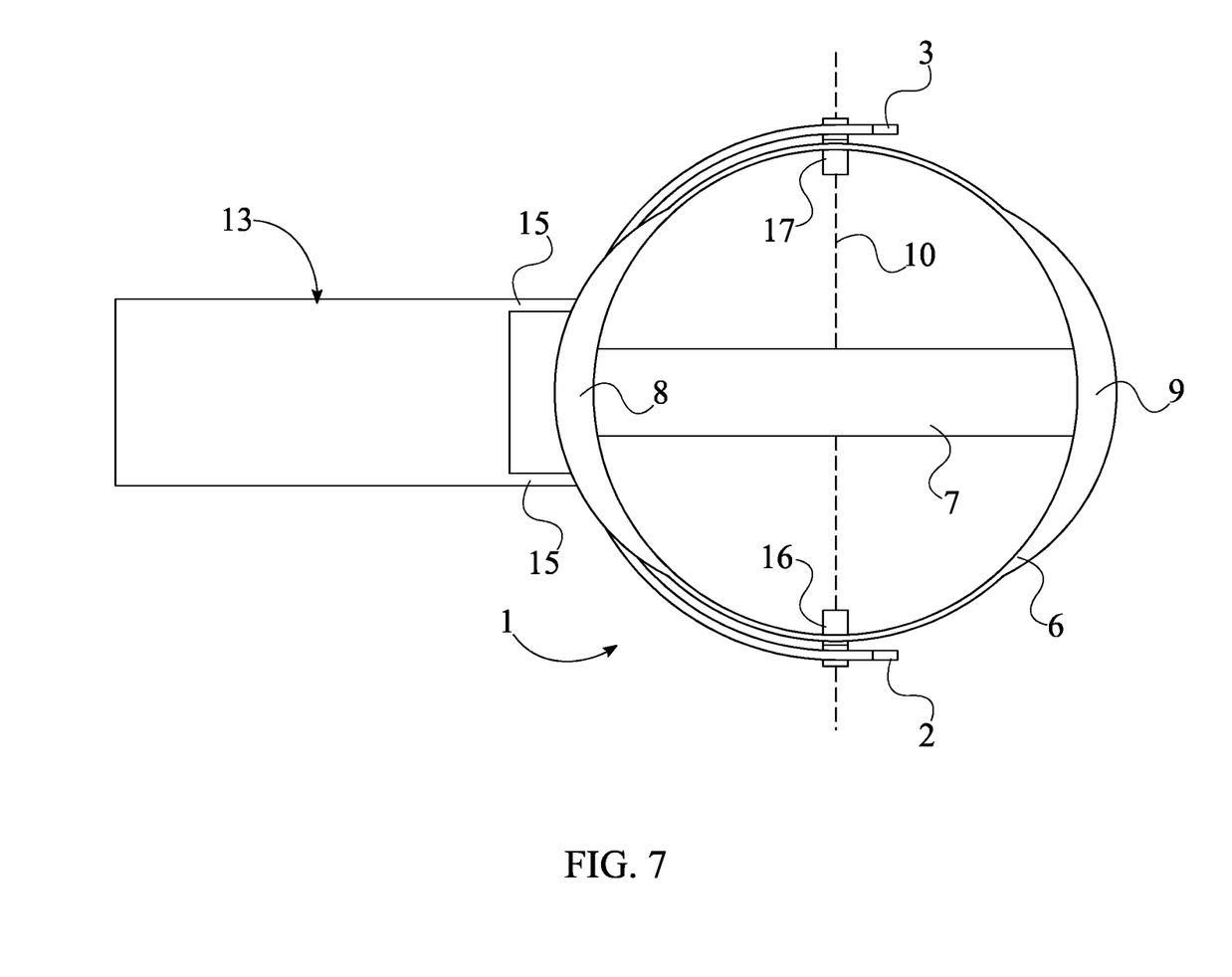
FIG. 7 is a top side view of the alternate embodiment of the present invention.
Figure 8:
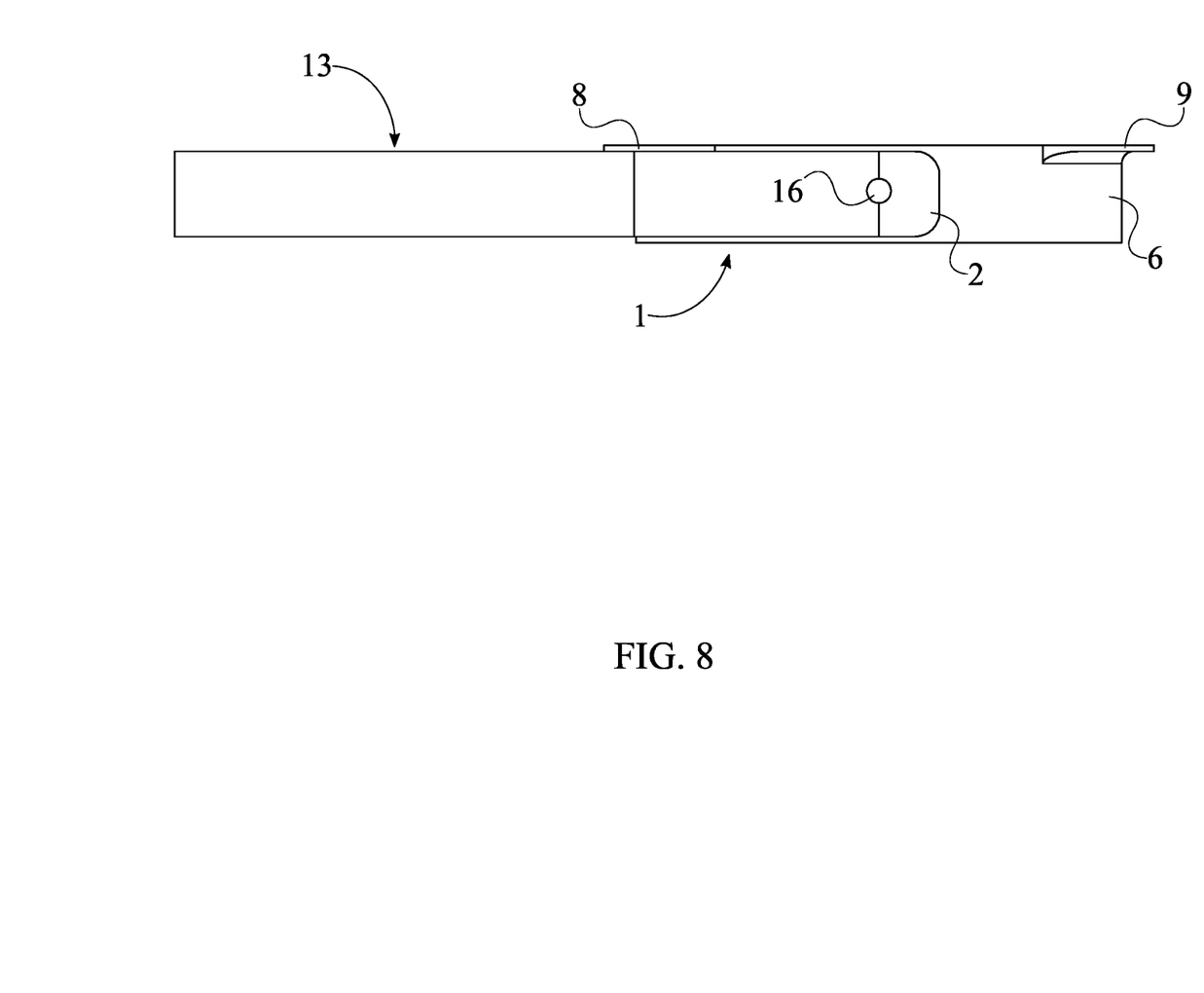
FIG. 8 is a right side view of the alternate embodiment of the present invention.

The overall configuration of the aforementioned components allows the grip of the user to rotate freely while maneuvering a wheelbarrow. The annular frame 6 is positioned between the first end 2 and the second end 3, as seen in FIG. 2 and FIG. 7, and is rotatably mounted at both the first end 2 and the second end 3, about a rotation axis 10. This arrangement prevents the forearm of the user from coming into contact with the arched brace 1 while preserving the continuous rotation of the grip of the user about the main handlebar 7. A slight rotation is seen in FIG. 3 and FIG. 4. The main handlebar 7 is connected across the annular frame 6 and is positioned perpendicular to the rotation axis 10, correctly aligning the grip of the user with the handlebar of the wheelbarrow. The first stopper 8 and the second stopper 9 are connected external to the annular frame 6. This arrangement prevents the annular frame 6 from rotating 360 degrees about the rotation axis 10, and consequently hurting the hand or arm of the user by being crushed between the arched brace 1 and the annular brace. The first stopper 8 and the second stopper 9 are positioned opposite each other about the annular frame 6, thereby maximizing the rotation of the annular frame 6 while preventing any injury of the hand or arm of the user. More specifically, the annular frame 6 comprises a first annular base surface 4 and a second annular base surface 5, seen in FIG. 1, FIG. 5, and FIG. 6. The first annular base surface 4 is positioned opposite the second annular base surface 5 through the annular frame 6. The first annular base surface 4 and the second annular base surface 5 are oriented parallel to the rotation axis 10. The first stopper 8 and the second stopper 9 are preferably mounted onto the first annular base surface 4 to maximize the degree of rotation about the rotation axis 10.

An alternate embodiment of the present invention further comprises a shield 11, seen in FIG. 1, FIG. 2, FIG. 3, and FIG. 4. The shield 11 prevents the fingers of the user from extending past the annular frame 6 and getting injured by the annular frame 6 and the arched brace 1. The shield 11 is perimetrically connected to the second annular surface so that the grip of the user remains correctly positioned and oriented with the main handlebar 7. More specifically, the shield 11 is configured into a dome-shaped profile to accommodate the curvature of both the arched brace 1 and the annular frame 6 throughout the rotation of the annular frame 6.

In order to structurally support the force of the first stopper 8 and the second stopper 9 against the arched brace 1 of the preferred embodiment of the present invention, the first stopper 8 is positioned adjacent the main handlebar 7, seen in FIG. 2 and FIG. 7. Similarly, the second stopper 9 is positioned adjacent the handlebar, opposite the first stopper 8. It is understood that the first stopper 8 and the second stopper 9 may be positioned at various positions across the first annular base surface 4 of the annular frame 6. However, the arrangement of the first stopper 8 and the second stopper 9 with respect to the main handlebar 7 of the preferred embodiment maximizes the force of which the arched brace 1 may withstand from contact with the first stopper 8 and the second stopper 9.

The preferred embodiment of the present invention comprises a wheelbarrow handlebar 12, as illustrated in FIG. 1, FIG. 2, FIG. 3, and FIG. 4. The wheelbarrow handlebar 12 is an integral part of a wheelbarrow that allows the user to directly maneuver a tray of the wheelbarrow. More specifically, in the preferred embodiment of the present invention, the arched brace 1 is integrated with a wheelbarrow. The wheelbarrow handlebar 12 is connected about the arched brace 1, opposite the annular frame 6, thereby allowing for the continuous rotation of the annular frame 6. The wheelbarrow handlebar 12 is preferably positioned perpendicular to the rotation axis 10 and is positioned offset from the main handlebar 7. This arrangement correctly aligns the grip of the user with respect to the wheelbarrow handlebar 12 as to minimize the amount of force from the user in order to maneuver the wheelbarrow.

An alternate embodiment of the present invention comprises a handlebar-receiving sleeve 13, as illustrated in FIG. 5, FIG. 6, FIG. 7, and FIG. 8. The handlebar-receiving sleeve 13 allows arched brace 1 to attached onto a variety of wheelbarrows. More specifically, this alternate embodiment serves as a universal attachment for wheelbarrows. It is understood that this alternate embodiment may be mounted onto a handlebar of a variety of utility carts, platform carts, and any other comparable chassis with handlebars similar to that of a wheelbarrow. This alternate embodiment serves to facilitate the maneuverability of a variety of items with compatible handlebars. Similarly, the handlebar-receiving sleeve 13 is mounted about the arched brace 1, opposite the annular frame 6, thereby allowing for the continuous rotation of the annular frame 6. An opening 14 of the handlebar-receiving sleeve 13 allows the handlebar-receiving sleeve 13 to be mounted onto the handlebar of a wheelbarrow. The opening 14 of the handlebar-receiving sleeve 13 is positioned opposite the arched brace 1. In order to correctly align the grip of the user with respect to the handlebar of the wheelbarrow, the handlebar-receiving sleeve 13 is positioned perpendicular to the rotation axis 10 and is positioned coplanar to the main handlebar 7. In order to preserve the structurally sound configuration of the present invention, this alternate embodiment of the present invention further comprises a pair of extension arms 15. The pair of extension arms 15 is positioned parallel and offset from each other and is connected in between the arched brace 1 and the handlebar-receiving sleeve 13.

The preferred embodiment of the present invention further comprises a first rivet 16 and a second rivet 17, seen in FIG. 1, FIG. 2, FIG. 5, FIG. 6, and FIG. 7. The first rivet 16 and the second rivet 17 reinforce the connection between the arched brace 1 and the annular frame 6. The first rivet 16 and the second rivet 17 also support the rotation of the annular frame 6 about the arched brace 1. More specifically, the first end 2 is rotatably attached to the annular frame 6 by the first rivet 16. Similarly, the second end 3 is rotatably attached to the annular frame 6 by the second rivet 17.

Although the invention has been explained in relation to its preferred embodiment, it is to be understood that many other possible modifications and variations can be made without departing from the spirit and scope of the invention as hereinafter claimed.

What is claimed is:

1. A pivoting-safety wheelbarrow handle comprises:
   an arched brace;
   an annular frame;
   a main handlebar;
   a first stopper;
   a second stopper;
   the arched brace comprises a first end and a second end;
   the annular frame being positioned between the first end and the second end;
   the annular frame being rotatably mounted at both the first end and the second end, about a rotation axis;
   the main handlebar being connected across the annular frame;
   the main handlebar being positioned perpendicular to the rotation axis;
   the first stopper and the second stopper being connected external to the annular frame; and,
   the first stopper and the second stopper being positioned opposite each other about the annular frame.

2. The pivoting-safety wheelbarrow handle as claimed in claim 1 comprises:
   the annular frame comprises a first annular base surface and a second annular base surface;
   the first annular base surface being positioned opposite the second annular base surface through the annular frame;
   the first annular base surface and the second annular base surface being oriented parallel to the rotation axis; and,
   the first stopper and the second stopper being mounted onto the first annular base surface.

3. The pivoting-safety wheelbarrow handle as claimed in claim 2 comprises:
   a shield; and,
   the shield being perimetrically connected to the second annular surface.

4. The pivoting-safety wheelbarrow handle as claimed in claim 3, wherein the shield is configured into a dome-shaped profile.

5. The pivoting-safety wheelbarrow handle as claimed in claim 1 comprises:
   the first stopper being positioned adjacent the main handlebar; and,
   the second stopper being positioned adjacent the handlebar, opposite the first stopper.

6. The pivoting-safety wheelbarrow handle as claimed in claim 1 comprises:
   a wheelbarrow handlebar; and,
   the wheelbarrow handlebar being connected about the arched brace, opposite the annular frame.

7. The pivoting-safety wheelbarrow handle as claimed in claim 6 comprises:
   the wheelbarrow handlebar being positioned perpendicular to the rotation axis; and,
   the wheelbarrow handlebar being positioned offset from the main handlebar.

8. The pivoting-safety wheelbarrow handle as claimed in claim 1 comprises:
   a handlebar-receiving sleeve;
   the handlebar-receiving sleeve being mounted about the arched brace, opposite the annular frame; and,
   an opening of the handlebar-receiving sleeve being positioned opposite the arched brace.

9. The pivoting-safety wheelbarrow handle as claimed in claim 8 comprises:
   the handlebar-receiving sleeve being positioned perpendicular to the rotation axis; and, the handlebar-receiving sleeve being positioned coplanar to the main handlebar.

10. The pivoting-safety wheelbarrow handle as claimed in claim 8 comprises:
   a pair of extension arms;
   the pair of extension arms being positioned parallel and offset from each other; and,
   the pair of extension arms being connected in between the arched brace and the handlebar-receiving sleeve.

11. The pivoting-safety wheelbarrow handle as claimed in claim 1 comprises:
   a first rivet; and,
   the first end being rotatably attached to the annular frame by the first rivet.

12. The pivoting-safety wheelbarrow handle as claimed in claim 1 comprises:
   a second rivet; and,
   the second end being rotatably attached to the annular frame by the second rivet.

\* \* \* \* \*